June 24, 1941.  S. W. E. ANDERSSON  2,246,653
REFRIGERATION
Filed Jan. 5, 1940  2 Sheets-Sheet 1

INVENTOR.
Sven W. E. Andersson
BY
D. E. Heath
his ATTORNEY.

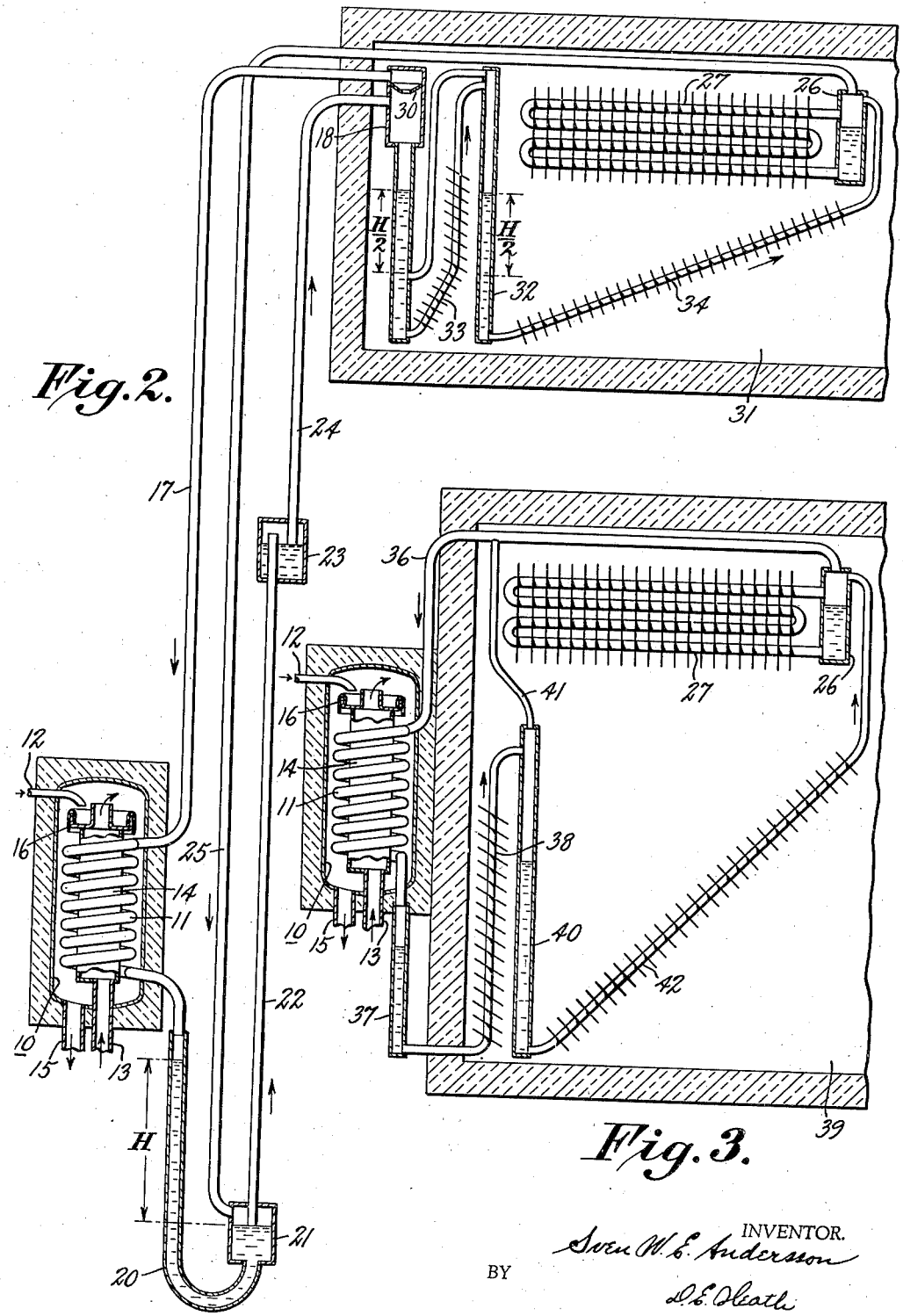

Patented June 24, 1941

2,246,653

UNITED STATES PATENT OFFICE 2,246,653

REFRIGERATION

Sven W. E. Andersson, Evansville, Ind., assignor to Servel, Inc., New York, N. Y., a corporation of Delaware Application January 5, 1940, Serial No. 312,465

15 Claims. (Cl. 62—125)

My invention relates to refrigeration and more particularly to a heat transfer system by which cooling may be effected at a place above a source of refrigeration.

It is an object of the invention to simplify and reduce the space requirement of a system of this character in which heat transfer liquid is raised from a place of condensation to a higher place of evaporation by lift action of vapor from the higher place of evaporation and utilizing liquid column valves.

In pursuance of this object, heat transfer liquid raised from a place of condensation by lift action of vapor is formed into a liquid column intermediate the place of condensation and the higher place of evaporation and raised from this column to the place of evaporation by lift action of vapor formed by vaporization of a part of the liquid in heat transfer relation with the medium to be cooled.

Figure 1:
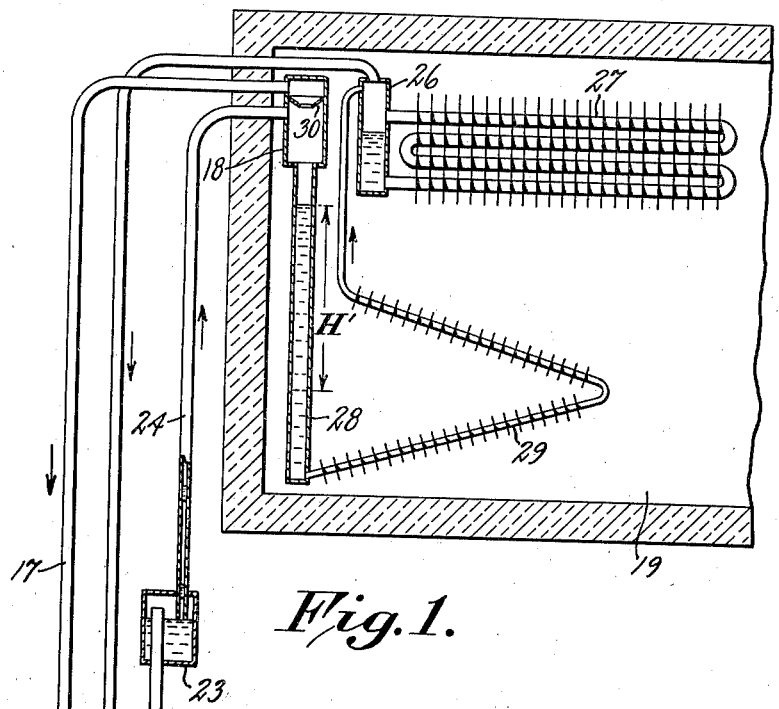
Figure 1:
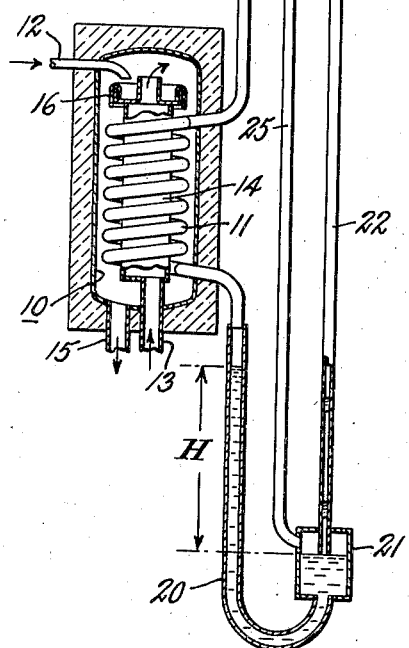

The invention will be more fully understood from the following description and accompanying drawings, of which Fig. 1 shows more or less schematically a heat transfer system embodying the invention;

Fig. 2 shows a system like that in Fig. 1 having an additional lifting stage; and Fig. 3 shows an embodiment of the invention in a system having a smaller lifting height.

Referring to Fig. 1, cooling element 10 represents a source of refrigeration. It is shown as an evaporator of a uniform pressure absorption type refrigeration system like that described in an application Serial No. 107,852 of Albert R. Thomas filed October 27, 1936, now Patent No. 2,207,838. In the evaporator 10 is a pipe coil 11. Liquid refrigerant enters the upper part of evaporator 10 through a conduit 12. Inert gas enters the upper part of evaporator 10 through a conduit 13 and a cylinder 14 which is within the pipe coil 11. Gas leaves the evaporator 10 through a conduit 15. Liquid refrigerant from conduit 12 flows into a distributor 16. Liquid is deposited from distributor 16 on the top of coil 11. The liquid refrigerant flows downward over coil 11 and evaporates and diffuses into the gas, producing a refrigeration effect for cooling the coil 11.

The upper end of coil 11 is connected by a conduit 17 to the top of a vessel 18. Vessel 18 is located in the upper part of a refrigerator storage compartment 19. The lower end of coil 11 is connected by a downwardly looped conduit 20 to the bottom of a vapor lift vessel 21. Vessel 21 is connected by a conduit 22, a reforming vessel 23, and a conduit 24 to vessel 18. The lower end of conduit 22 projects downward into vessel 21 and is open at its lower end within this vessel. The upper end of conduit 22 projects upward into vessel 23 and is open in the upper part of this vessel. Conduit 24 projects downward into vessel 23 and is open at its lower end below the upper end of conduit 22.

The upper part of vessel 21 is connected by a conduit 25 to the top of a vessel 26 located in the upper part of refrigerator compartment 19. The upper and lower ends of an evaporator coil 27 are connected respectively to the upper and lower parts of vessel 26. Vessel 26 forms a header for coil 27 and together they form an evaporator for cooling compartment 19.

The upper end of a tube 28 is connected to the bottom of vessel 18. The lower end of tube 28 is closed. An evaporator coil 29 is located in refrigerator compartment 19 below evaporator 27, for instance, in the bottom of compartment 19. The lower end of evaporator coil 29 is connected to the bottom of tube 28. The upper end of evaporator coil 29 is connected to the upper part of vessel 26.

Coil 11 and evaporators 27 and 29 together with the above described connections therebetween form a heat transfer system which is evacuated and charged with a suitable heat transfer fluid, such as methyl chloride. When the refrigeration apparatus is started, the evaporator 10 lowers the temperature of coil 11, causing condensation of vapor in this coil and a reduction in pressure in this coil and also in conduit 17 and vessel 18. Due to this reduction in pressure, vapor from vessel 26 flows through conduit 25 into vessel 21. Vapor in vessel 21 depresses liquid to the bottom of conduit 22 and bubbles upward into liquid in this conduit. This causes upward flow of liquid in conduit 22 by known vapor lift action. Vapor and liquid emerge from the upper end of conduit 22 in vessel 23. The liquid drops into the lower part of vessel 23 and the vapor again bubbles through this liquid into the lower end of conduit 24 causing flow of liquid upward in conduit 24 by known vapor lift action. Vapor and liquid emerge from the upper end of conduit 24 in vessel 18. The liquid flows from vessel 18 downward into tube 28 and coil 29 which together form a liquid trap. The vapor flows from vessel 18 through conduit 17 to the condenser coil 11. A baffle 30 may be arranged in vessel 18 between conduits 24 and 17 to prevent splashing of liquid into conduit 17.

The vapor condenses to liquid in condenser coil 11 and flows downward into conduit 20, vessel 21 and conduit 22, which together form a liquid trap. The low pressure in condenser coil 11 and the higher pressure in vessel 21 cause formation of a liquid column in conduit 20 which stands at a height H above the lower end of conduit 22. Liquid vaporizes in evaporator coil 29 and becomes trapped in liquid in this coil causing upward flow of liquid therein by known vapor lift action into vessel 26. Vessel 26 extends above the surface level of liquid in tube 28. Also, the pressure in vessel 26 is higher than the pressure above the surface level of liquid in tube 28 by the weight of the liquid column H. This causes formation in tube 28 of a liquid column of a height H', which is equal to the height H, plus a smaller height which provides reaction head for the lifting of liquid above the surface level of liquid in tube 28 into vessel 26.

In some installations the refrigerator compartment may not be sufficiently high to accommodate a tube 28 that is long enough to hold the requisite liquid column. This might also be the case with a taller refrigerator compartment but where there is an unusually high lift from the condenser to the evaporator. In such instance, the embodiment of the invention shown in Fig. 2 may be used.

In Fig. 2, parts which are the same as the parts shown and described in connection with Fig. 1 are identified by the same reference numerals. In this modification, tube 28 may be shorter so that it can be located in a shallower refrigerator compartment 31, and a second upright tube 32 is provided in compartment 31. The bottom of tube 28 is connected to the upper part of tube 32 by a finned evaporator coil 33. The bottom of tube 32 is connected to the evaporator header 26 by a finned evaporator coil 34. The upper end of tube 32 is connected by a conduit 35 to a low point of tube 28.

Assuming the total lift height, that is, the distance from the lower end of conduit 22 to the upper end of conduit 24, is the same as that of the system shown in Fig. 1, operation of the refrigeration apparatus will cause formation of the liquid column of height H in tube 20 and raising of liquid from vessel 21 into vessel 18 by vapor which flows to vessel 21 from evaporator header 26 through conduit 25 as previously described. Liquid which is deposited from vessel 18 into tube 28 and evaporator coil 33 is raised through evaporator coil 33 into the upper end of tube 32 by known vapor lift action. In the upper part of tube 32, the liquid and vapor separate, the liquid descending into the lower part of tube 32 and evaporator coil 34. The vapor flows through conduit 35 into tube 28 where it bubbles upward through liquid in this tube and joins vapor from the upper end of conduit 24 in vessel 18. The pressure of vapor in tube 32 is greater than the pressure in tube 28 and vessel 18 by the height of the surface level of liquid in tube 28 above the connection to tube 28 of conduit 35.

Liquid is raised from the lower end of tube 32 through evaporator coil 34 into the evaporator header 26 by known vapor lift action. In the evaporator header 26, liquid and vapor issuing from the upper end of coil 34 separate. The liquid replenishes the supply to evaporator 27, and the vapor joins vapor from the evaporator 27 and flows therewith through conduit 25 to the main vapor lift. Since vessel 18 is connected to condenser 11 by conduit 17, the pressure above the liquid column in tube 28 is the same as the pressure above the liquid column in tube 20 which is substantially the same pressure as in the condenser, which is the lowest pressure in the system. The pressure in evaporator header 26 is higher than this lowest pressure by the weight of the liquid column of height H. Assuming that the lifting heights from the bottom of tubes 28 and 32 through coils 33 and 34 respectively are the same, and that conduit 35 is connected to tube 28 a distance below the surface level of liquid in this tube that is one-half of the height H, then the pressure in tube 32 is half-way between the lower pressure in vessel 18 and the higher pressure in vessel 26. Also, each of the columns of liquid in tubes 28 and 32 is of a height that is equal to one-half of the height H plus an additional height sufficient to supply reaction head for the lifting distance through each of coils 33 and 34.

When the refrigeration apparatus can be located on the same floor level as the refrigerator compartment so that the total lift height from the condenser to the evaporator of the heat transfer system is small, the heat transfer system may be arranged as shown in Fig. 3. The elements of Fig. 3 which are the same as those shown and described in connection with Figs. 1 and 2 are indicated by the same reference numerals. In this arrangement, the upper end of condenser coil 11 is connected by a conduit 36 directly to the evaporator header 26. The lower end of condenser coil 11 is connected to the upper end of tube 37. The lower end of tube 37 is connected to the lower end of evaporator coil 38 located in a refrigerator compartment 39 below the main evaporator 27. The upper end of coil 38 is connected to the upper part of tube 40 located vertically in the refrigerator compartment. The upper end of tube 40 is connected by a conduit 41 to conduit 36. The lower end of tube 40 is connected to the lower end of an evaporator coil 42. The upper end of coil 32 is connected to the evaporator header 26.

When the refrigeration apparatus is started and the pressure drops in condenser coil 11, the pressure drops correspondingly in evaporator 27 and tube 40, both of which are in open communication with the condenser through conduits 41 and 36. Evaporation of liquid takes place in evaporators 27, 38 and 42. Vapor formed in evaporator 38 flows upward into tube 40 causing upflow of liquid from tube 37 into tube 40 by known vapor lift action. The vapor flows to the condenser through conduits 41 and 36. Vapor formed in evaporator 42 flows upward into header 26 and causes upward flow of liquid from tube 40 into header 26 by known vapor lift action. The vapor joins the vapor from evaporator 27 and flows through conduit 36 to the condenser. Vapor is liquefied in the condenser coil 11 and flows downward into tube 37 from where it is raised to the evaporator header 26 as described.

Various changes and modifications may be made within the scope of the invention as set forth in the following claims.

What is claimed is:

1. A system for transmitting refrigeration from a refrigeration source to a higher elevation which includes an evaporator at said higher elevation, a condenser cooled by said refrigeration source and at a lower elevation, conduits connecting said evaporator and condenser in a circuit for volatile fluid, said conduits including means to maintain liquid columns all of which are below said evaporator and including a first column below said condenser and a second column above said condenser but below said evaporator, a vapor liquid lift for raising liquid from said first column to said second column, and a second vapor liquid lift for raising liquid from said second column to said evaporator.

2. A system as set forth in claim 1 in which said first vapor lift is operated by vapor from said evaporator.

3. A system as set forth in claim 1 in which said evaporator is located in a refrigerator storage compartment, and said second vapor lift comprises a second evaporator below said first evaporator in said compartment.

4. A system as set forth in claim 1 in which said evaporator is located in a refrigerator storage compartment, said first vapor lift receives vapor from said evaporator, and said second vapor lift comprises a second evaporator located below said first evaporator in said compartment.

5. A system as set forth in claim 1 in which each of said vapor lifts comprises an evaporator in a refrigerator storage compartment.

6. A system for transmitting refrigeration from a refrigeration source to a higher elevation which includes an evaporator at the higher elevation, a condenser arranged to be cooled by said refrigeration source and at a lower elevation, conduits interconnecting said condenser and evaporator and forming therewith a circuit for volatile fluid, said conduits including means for maintaining a plurality of liquid columns all of which are below said evaporator and including a first liquid column below said condenser and a plurality of liquid columns above said condenser but below said evaporator, a first vapor liquid lift for raising liquid from said first column to a higher column, and other vapor lifts for raising liquid in series from one column to another and thence to said evaporator.

7. A system as set forth in claim 6 in which each of said other vapor lifts comprises an evaporator in a refrigerator storage compartment.

8. A system as set forth in claim 6 in which at least one of said other vapor lifts comprises an evaporator in said storage compartment.

9. A system as set forth in claim 6 in which said first vapor lift receives vapor from said evaporator and each of said other vapor lifts comprises an evaporator in a refrigerator storage compartment.

10. A method of heat transfer which includes evaporating liquid refrigerant at a place of evaporation, condensing the vapor at a place of condensation below said place of evaporation, raising liquid from said place of condensation by vapor lift action in a first step to a level below said place of evaporation, and raising liquid from said last level to said place of evaporation by vapor lift action, and carrying out said second vapor lift action directly between the pressures at said level and at said place of evaporation.

11. A method as set forth in claim 10 which includes using vapor from said place of evaporation for said first vapor lift action.

12. A method as set forth in claim 10 which includes carrying out said second vapor lift action in a plurality of steps.

13. A method as set forth in claim 10 which includes forming vapor for said second vapor lift action by vaporizing liquid by transfer of heat from the medium to be cooled.

14. A method as set forth in claim 10 which includes forming vapor for both of said vapor lift actions by vaporizing liquid by heat transfer from a medium to be cooled.

15. A method as set forth in claim 10 which includes using vapor from said place of evaporation for said first vapor lift action, and forming vapor for said second vapor lift action by vaporization of liquid by heat transfer from a medium to be cooled at said place of evaporation.

SVEN W. E. ANDERSSON.